April 29, 1969     W. E. EICHELBERGER     3,440,873

MINIATURE PRESSURE TRANSDUCER

Filed May 23, 1967

INVENTOR.
WILLIAM E. EICHELBERGER
BY William J. Simmons Jr.
ATTORNEY

United States Patent Office 3,440,873
Patented Apr. 29, 1969

3,440,873
MINIATURE PRESSURE TRANSDUCER
William E. Eichelberger, Raleigh, N.C., assignor to Corning Glass Works, Corning, N.Y., a corporation of New York
Filed May 23, 1967, Ser. No. 640,737
Int. Cl. G01l 5/12, 5/18
U.S. Cl. 73—141                                    13 Claims

ABSTRACT OF THE DISCLOSURE

A micro-sized pressure transducer which comprises a field effect transistor (FET) having a specially designed gate plane electrode which is made of a compliant material and is supported at its periphery so that its central portion is free to move relative to the surface of the FET. With a fixed bias voltage applied to the gate plane electrode, the strength and depth of penetration of the electric field in the conducting channel of the FET is a function of the distance between the gate plane electrode and the surface of the transistor substrate. The effect of this varying field on the conducting channel varies the transistor channel current.

BACKGROUND OF THE INVENTION

It is conventional practice to couple to the input of a field effect transistor, transducers such as differential transformers, diaphragm-type, displacement sensitive variable capacitors and the like. Some of the limitations of such combinations are as follows: The diaphragm affords excellent sensitivity and higher frequency capabilities than any other displacement type transducer, but it is velocity sensitive and, therefore will not ordinarily measure static levels. Differential transformers measure very small displacements with excellent sensitivity but the mass of the moving member and its associated inertia limits the frequency response to low and continuous levels. Other transducers such as strain gauges and dynamic microphone pickups are limited by low sensitivity or transfer gain which is a measure of input force to output electrical level or by loss of continuum response. Ceramic type pressure transducers afford excellent transfer gain but they are high output impedance devices and lack continuum response.

SUMMARY OF THE INVENTION

It is accordingly an object of this invention to provide a pressure transducing field effect transistor which affords high transfer gain a selection of either low or high output impedance low noise injection and response from continuum to the limits of diaphragm resonance which can be well above 100 kc.

Another object of this invention is to provide a means for transducing pressures into electrical energy with a minimum of components.

A further object of this invention is to provide a displacement sensitive transducer which is responsive to very slowly changing or static levels of pressure.

Still another object of this invention is to provide an integrated transducer wherein the active and passive elements are housed in an enclosure of small size and weight, thereby permitting the utilization of the device in such components as phonograph pickups, microphones and devices for measuring linear displacement.

In accordance with this invention a pressure transducer and field effect transistor amplifier are combined into one integrated transducing device. Such external pressure translating devices as diaphragms strain gauges, accelerometers and the like are unnecessary. This invention utilizes a field effect semiconductor device having a gate plane electrode, part of which is separated from the semiconductor body and is thereby free to move with respect thereto. This integrated transducing device exhibits such advantages of the majority carrier field effect transistor as either a low or high impedance output depending on circuit configuration and low noise characteristic.

Other objects, features and advantages of this invention will become apparent during the course of the following detailed description and the attached drawing, on which, by way of example, only the preferred embodiments of this invention are illustrated.

DETAILED DESCRIPTION

Existing FET designs utilize a fixed gate plane electrode positioned above the channel between the source and drain terminals, the channel current being controlled by the voltage on the gate plane electrode. U.S. Patent No. 3,102,230, issued Aug. 27, 1963, to Dawon Kahng, discloses such a prior art FET. The field established across the insulation of the gate plane penetrates into the base material to form an inversion of its characteristics to the opposite phase material, i.e., p to n or n to p, thus forming a channel between the two semiconducting materials of the source and drain electrodes. Changing the potential on the gate plate electrode will change the field penetration and thus control the effective channel thickness. The effective channel thickness has a direct functional control on the resistivity of the channel and, therefore, the amount of current flowing in the channel. In the conventional FET the variables available for controlling the channel current are the source to drain voltage and the gate voltage.

Figure 1:
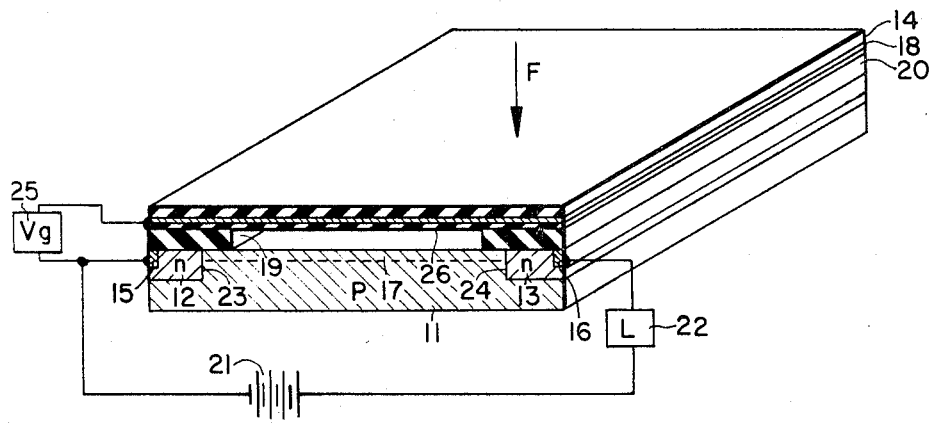
FIGURE 1 is an oblique view partially in cross section of the preferred embodiment of this invention.

The pressure transducting field effect transistor which is shown in FIGURE 1 adds a third controlling variable to the device. A field effect semiconductor device, as is well known in the art, may consist of a substrate 11 of p-type conductivity having spaced surface regions 12 and 13 which are heavily doped regions of n-type conductivity. Ohmic contacts 15 and 16 are connected to the surface portions 12 and 13 respectively. A thin conduction channel, which is represented by the dashed line 17, exists at the surface of the substrate 11 between the surface portions 12 and 13. A gate plane diaphragm assembly, which consists of the superimposed layers of a compliant insulating layer 14 and a conductor 18, is supported above the substrate 11 by insulators 19 and 20. The insulators 19 and 20, which are about 10,000 angstroms or greater in thickness, can be an oxide deposited on the substrate or can be separately formed and attached by a well known technique such as bonding. Although the device shown in FIGURE 1 is rectangular in shape, other shapes, including circular structures, could be used to implement the same characteristics. The device in FIGURE 1 is described as being an npn device; however, a pnp device would function equally as well. Silicon is a preferred material for use as the substrate 11. The n-type regions 12 and 13 may be obtained by diffusing an impurity such as phosphorus into the p-type silicon substrate using conventional oxide masking techniques.

A battery 21 and a load or current flow indicator 22 are serially connected between the contacts 15 and 16. The polarity of the battery forward biases a p-n junction 23 which partially surrounds the surface portion 12 and reverse biases a p-n junction 24 which partially surrounds the surface portion 13. A D.C. bias source 25, which is connected between the contact 15 and the metallized surface 18, biases the gate plane positive with respect to the surface portion 12. Although depletion mode biasing has been described, the FET could be biased to operate in the enhancement mode.

On application of a force represented by the arrow F, the gate plane assembly is moved toward the channel to effectively reduce the distance therebetween. The distance between the gate plane electrode and the substrate surface is a controlling influence on the strength and depth of penetration of the electric field induced in the substrate. In response to a fixed voltage applied to the gate plane electrode, the channel current is a function of the electrode to substrate spacing. Thus, by applying a D.C. voltage to the gate plane electrode and varying the force applied to the gate plane, the field effect transistor in this figure will function as a pressure transducer.

The gate plane diaphragm assembly may be fabricated from a variety of materials such as metallized glass with a thin oxide insulation 26 grown on the metallized portion to prevent it from shorting to the channel. Any other oxide insulated metal bonded to other substrates such as plastics or a self-supporting metal sheet having a suitable oxide thickness for insulation may be used for the gate plane diaphragm.

Figure 2:
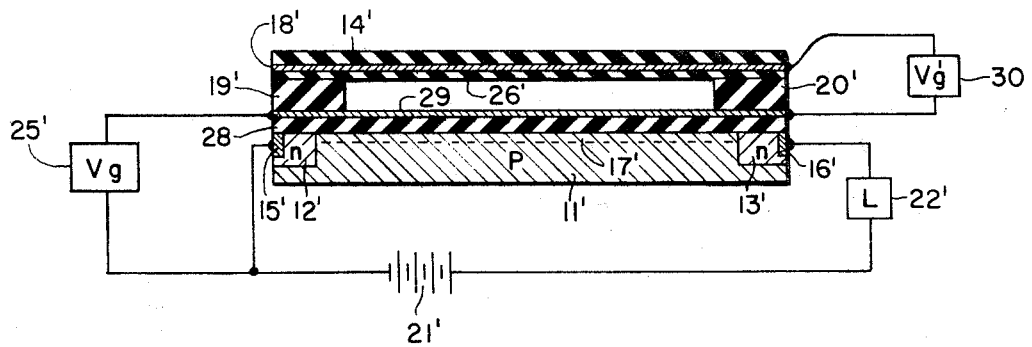
FIGURE 2 is a cross sectional elevational view of another embodiment of this invention.

The embodiment shown in FIGURE 2 is similar to that of FIGURE 1, similar elements being designated by primed reference numerals. An insulating layer 28 and a conductive layer 29 have been added to the conduction channel surface of the substrate 11'. In this embodiment a bias source 30 is connected between the conductive layers 18' and 29 and biases the layer 18' positive with respect to the layer 29. The two metallic surfaces 18' and 29 act as a variable capacitor, a higher positive voltage being induced in the layer 29 when the layer 18' is deflected closer thereto. FIGURE 2 operates in a manner similar to that of FIGURE 1, the induced voltage on the conductive layer 29 controlling the conductivity of the chanel 17' between the regions of n-type conductivity. The channel current is, therefore, a function of the amount of deflection of the electrode 18' toward the conductive layer 29.

With the present disclosure in view, modifications of the invention will appear to those skilled in the art, and accordingly, it is not desired to be limited to the exact details of the above illustrated embodiments.

What is claimed is:

1. A pressure transducer comprising a field effect semiconductor device having a conduction channel in one surface thereof, the conduction thereof being a function of the strength of an applied electric field which traverses said channel, a compliant gate plane electrode assembly, and means to support said gate plane electrode assembly adjacent said channel so that a portion thereof is free to move with respect to said channel so that the conductivity of said channel is a function of the deflection of said gate plane electrode assembly with respect to said channel.

2. A pressure transducer in accordance with claim 1 wherein said semiconductor device comprises a substrate of a first type conductivity material having spaced surface regions, the conductivity of which is opposite that of said first type conductivity, said conduction channel extending between said surface regions, and first and second ohmic contacts in contact with said first and second surface regions respectively.

3. A pressure transducer in accordance with claim 2 which further comprises means connected between said first and second ohmic contacts for displaying the amplitude of the current flowing in said conduction channel.

4. A pressure transducer in accordance with claim 1 wherein said compliant gate plane electrode assembly comprises a planar, compliant insulator and a layer of conductive material on the side of said planar insulator adjacent said channel.

5. A pressure transducer in accordance with claim 4 which further includes a thin insulative layer on the side of said conductive layer adjacent said channel.

6. A pressure transducer in accordance with claim 1 which further includes an insulating layer on said one surface of said field effect transistor and a thin conducting layer on said last mentioned insulating layer, said means for supporting said gate plane electrode being located on said last mentioned conductive layer.

7. A pressure transducer in accordance with claim 1 wherein said cimpliant gate plane electrode assembly comprises a thin planar sheet of glass having a thin conductive layer on the surface thereof which is adjacent said channel, and a thin insulating layer on the surface of said conductive layer.

8. A pressure transducer comprising:
a semiconductor substrate of a first conductivity type of material having first and second spaced surface regions of opposite conductivity type material, a conductive channel being formed between said first and second surface regions,
first and second ohmic contacts to said first and second surface regions, respectively,
at least one insulating support member on the surface of said semiconductor substrate on which said spaced surface regions are situated, and
a gate plane electrode assembly situated on said support so that a portion thereof is free to move with respect to said channel in such manner that the conductivity of said channel is a function of the deflection of said gate plane electrode assembly toward said channel.

9. A pressure transducer in accordance with claim 8 wherein said compliant gate plane electrode assembly comprises the superimposed layers of a planar nonconducting material, a conducting layer on said nonconducting layer, and a thin insulating layer on said conducting layer, said thin insulating layer being situated on said support member.

10. A pressure transducer in accordance with claim 8 which further comprises means connected to said first and second ohmic contacts for impressing a voltage across said first and second spaced surface regions, means in series with said last mentioned means for indicating the current flowing between said first and second surface regions, and means for impressing a voltage across said gate plane electrode assembly and one of said surface regions, so that the strength and depth of penetration of the electric field generated by said gate plane assembly in said conductive channel is a function of the amount of deflection of said gate plane electrode assembly toward said channel.

11. A pressure transducer comprising:
a semiconductor substrate of a first conductivity type of material having first and second spaced surface regions of opposite conductivity type of material, a conductive channel being formed between said first and second surface regions,
first and second ohmic contacts connected to said first and second surface regions, respectively,
a dielectric coating on the surface of said semiconductor substrate over said conductive channel,
a first planar electrode on said dielectric coating,
at least one insulating support member on said first planar electrode, and
conductive gate plane electrode means located on said support member in such a manner that said gate plane electrode means is free to move with respect to said channel in such a manner that the conductivity of said channel is a function of the deflection of said gate plane electrode means.

12. A pressure transducer in accordance with claim 11 wherein said gate plane electrode means comprises a thin planar insulating substrate, a conducting layer on said substrate, and a thin insulating layer on said conducting layer, said thin insulating layer being situated adjacent said first planar electrode.

13. A pressure transducer in accordance with claim 11 which further comprises means connected to said first and second ohmic contacts for impressing a voltage across said first and second spaced surface regions, means in series with said last mentioned means for indicating the current flowing between said first and second surface regions, means for impressing a voltage across said gate plane electrode means and one of said surface regions, and means for impressing a voltage across said first planar electrode and said gate plane electrode means, the deflection of said gate plane electrode means toward said first planar electrode inducing a voltage in said first planar electrode which, when added to the voltage on said first planar electrode, controls the strength and depth of penetration of electric field in said conductive channel, thereby controlling the current flowing through said conductive channel.

References Cited

UNITED STATES PATENTS

| | | |
|---|---|---|
| 2,025,461 | 12/1935 | Leonard. |
| 2,155,419 | 4/1939 | Gunn _____ 73—398 XR |
| 3,287,506 | 11/1966 | Hahnlein. |
| 3,355,935 | 12/1967 | Grossvalet _____ 73—88.5 |

U.S. Cl. X.R.

CHARLES A. RUEHL, *Primary Examiner.*

317—235